July 24, 1962    E. SAUER ET AL    3,045,570
PHOTOGRAPHIC CAMERA WITH BUILT-IN COUPLED EXPOSURE METER
Filed Nov. 24, 1958    2 Sheets-Sheet 1

United States Patent Office
3,045,570
Patented July 24, 1962

3,045,570
PHOTOGRAPHIC CAMERA WITH BUILT-IN COUPLED EXPOSURE METER
Edgar Sauer, Stuttgart, Willi Günther, Stuttgart-Mohringen, and Horst Wutzler, Stuttgart-Degerloch, Germany, assignors to Zeiss Ikon A.G. Stuttgart, Stuttgart, Germany
Filed Nov. 24, 1958, Ser. No. 775,933
Claims priority, application Germany Dec. 6, 1957
10 Claims. (Cl. 95—10)

The invention relates to photographic camera and particularly to a photographic camera whose adjusting devices for the shutter and the diaphragm aperture are operatively connected with a photoelectric exposure meter. It has been proposed heretofore in photographic cameras to operatively connect a photoelectric exposure meter with the adjustable diaphragm and the shutter speed adjusting members by a differential gearing. This known arrangement requires a substantial amount of space and is rather costly because it complicates the manufacture of these cameras.

It is an object of the invention to simplify the construction of cameras of this type by employing as an operative connection between the exposure meter and the mentioned adjustable camera members a differential gearing and a transmission gearing which are designed in such a manner that the adjusting movements of the adjusting members for each light value unit are equal to each other and coincide with the respective interval movements of the shutter and the diaphragm mechanisms.

It is also an object of the invention to provide the mentioned operative connection with sun wheel gear segments having crown teeth between which a planetary gear rim is arranged which carries several spur gears.

The sun wheel gear segments are arranged on the shutter speed adjusting member, on the light value member, on the diaphragm adjusting member, and on a stationary part, such as the camera.

In accordance with another object of the invention, the planetary gear rim is provided with two spur gears, one of which cooperates with the gear segments on the shutter speed adjusting member and on the light value member, respectively, while the other cooperates with the gear segments on the diaphragm adjusting member and on the stationary part, respectively. The gear segments on the shutter speed adjusting member and on the exposure member form with the spur gear therebetween a differential gearing, while the gear segments on the diaphragm adjusting member and the stationary part, respectively form with the spur gear therebetween a transmission gearing.

These and other objects of the invention will now be described in detail with reference to the accompanying drawings which illustrate by way of example one embodiment of the invention.

Figure 1:
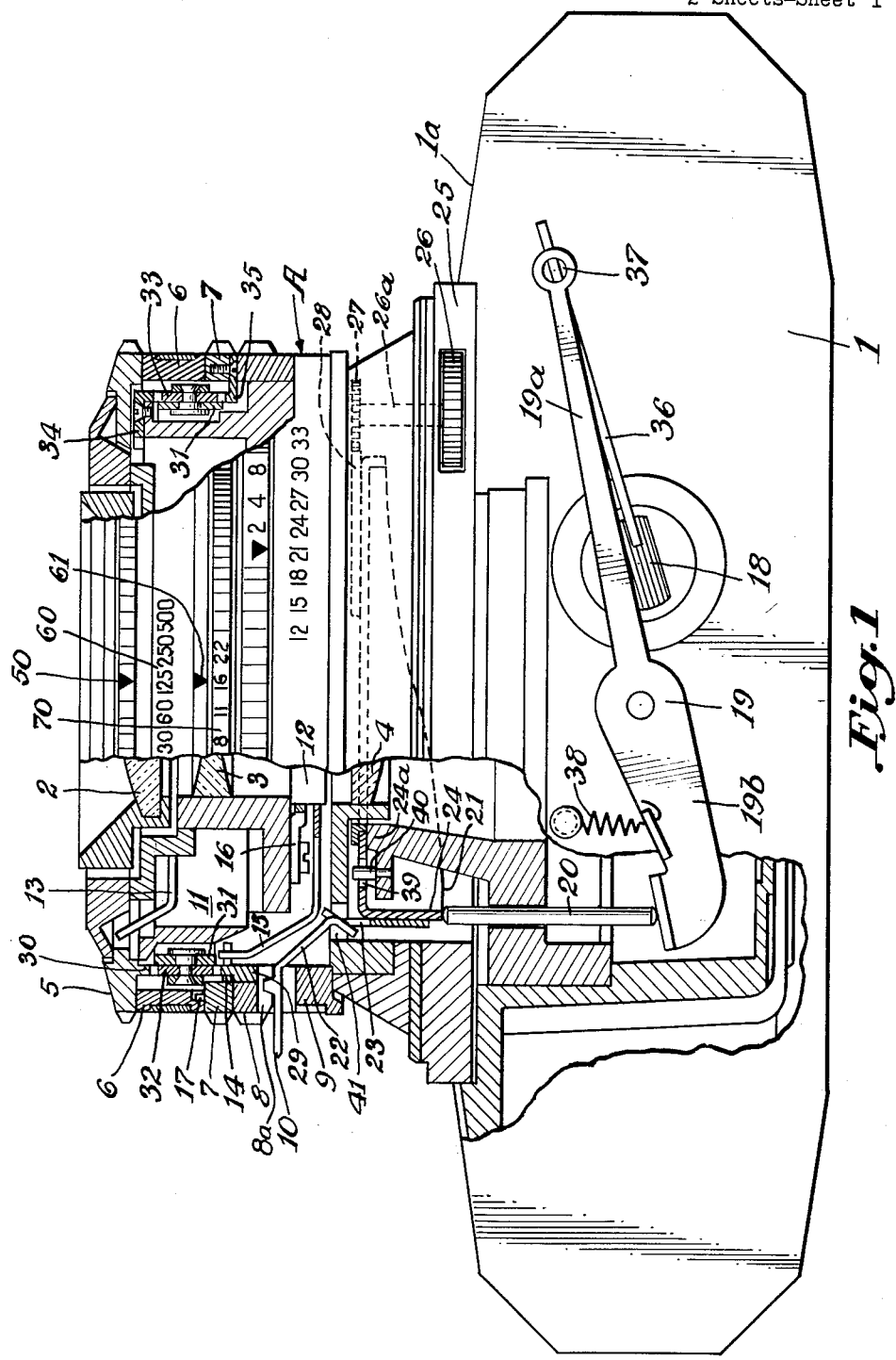
FIGURE 1 shows a top plan view of a photographic camera with certain parts in section.

Refrring to FIGURE 1, the camera casing 1 has attached to its front wall 1a a photographic objective A provided with an axially adjustable front lens 2 for focusing. This lens 2 may also be made exchangeable so as to change the photographic objective into one having a different focal length. The photographic objective 4 is also provided with a stationary center lens 3 and a rear lens 4. The shutter speed adjusting ring 5 is provided with an index 50 and a stationary ring 6 is provided with a shutter speed scale 60 and a diaphragm index 61. The diaphragm adjusting ring 7 is provided with a diaphragm scale 70 and is arranged adjacent a light value indicating ring 8. The rings 5, 7 and 8 are rotatably adjustable.

Another rotatably adjustable ring 9 permits an adjustment of the photographic objective to the speed of the film. This ring 9 is releasably connected to the light value ring 8 by a coupling element 10. The coupling element 10 is carried by the ring 9 and when the outwardly extending end of the coupling element 10 is depressed it is moved out of operative engagement with recesses 8a formed in the ring 8, whereupon the ring 9 can be freely rotated to the desired film speed and in doing so an inner arm 22 on the coupling element 10 rotates the dish-shaped cam member 24 forming a part of the exposure meter whose action and adjustment in effecting the setting of the diaphragm and shutter will be described hereinafter. All the mentioned rings are arranged concentrically about the optical axis and surround the shutter housing 11 and the lenses 2, 3, and 4, respectively. The diaphragm mechanism is indicated at 12. The shutter speed adjusting ring 5 is connected with the shutter gearing by a lever 13, while the diaphragm adjusting ring 7 is connected by stop members 14, 15 with the diaphragm mechanism 12. The stop members 14, 15 are provided for making a pre-selection of the diaphragm opening to be used during the exposure. The rotative adjustment of one of the two diaphragm segment rings of the diaphragm mechanism 12 is controlled by the lever 15, while the second diaphragm segment ring is secured against rotation at 16. The diaphragm adjusting ring 7 can perform only a limited degree of rotative adjustment as is indicated by the pin and slot connection 17, and thereby prevents an accidental rotation of same over the available diaphragm range.

The camera is equipped with a built-in photoelectric exposure meter whose electrical measuring instrument 18 is provided with a double-arm lever 19, one arm 19a of which forms a follow-up pointer wtih a circular eye 37 at its outermost end. This eye 37 has to be brought into a position in which the instrument pointer 36 of the measuring instrument 18 will divide the eye 37 into two halves. The other arm 19b engages one end of an axially movable pin 20, the other end of which engages a cam 21 which compensates the nonlinearity deflection of the pointer 36. A cam edge 21 is provided on a dish-shaped member 24 rotatably supported about the optical axis on a collar 24a within the camera casing. A coupling plate 23 on the member 24 forms with an arm 22 on the coupling element 10 a plug-in coupling with the rings 8 and 9. A spring 38 holds the arm 19b of the follow-up pointer 19a in engagement with the pin 20 which in turn engages the edge 21 of the cam member 24. The dish-shaped cam member 24 is rotatable by the light value ring 8 which is provided with a knurled circumference or by means of a knurled wheel 26, which projects from the mounting plate 25 of the camera objective A. The knurled wheel 26 operates over a shaft 26a and a pinion 27 a gear segment 28 secured to the bottom of said dish-shaped member 24. In case that not only the front lens 2 is axially adjustable, but the photographic objective is adjustable as a unit, and may be interchangeable as a unit, it would be advisable to provide a worm gearing which provides an axial adjustment of the entire photographic objective. Furthermore, a coupling connecting the different parts along the entire range of axial adjustment should be provided in place of plug-in connection 22, 23.

Figure 2:
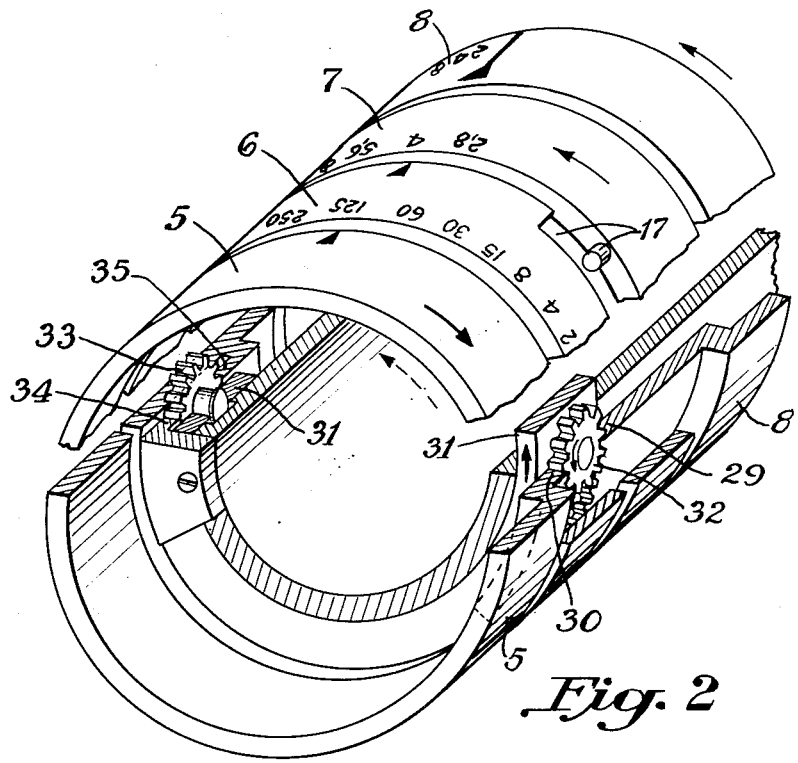
FIGURE 2 shows a perspective view of the parts, forming the differential gearing.

A crown gear segment 29 is secured to the light value ring 8, and another crown gear segment 30 is secured to the adjacent shutter speed adjusting ring 5. Both said segments are so arranged to engage with their teeth a planetary spur gear 32 carried by a planetary gear rim 31 which is disposed inside the stationary ring 6 and thereby the parts form a differential gearing. Another planetary spur gear 33 is displaced at 180° about the optical axis and is carried by the same gear rim 31, and meshes with the teeth of crown gear segments 34 and 35 on the stationary ring 6 and the diaphragm adjusting ring 7, respectively, thereby forming a transmission gearing. FIG. 2 shows the arrangement of the intermeshing gear parts 29 to 35 in a perspective view, and likewise the rings 5 to 8 are shown in their position next to each other and one within the other.

The operation is as follows:

After a deflection of the instrument pointer 36 indicating a certain light value, the follow-up pointer 19a is brought into coincidence with the instrument pointer 36 by rotatably adjusting the light value ring 8 or the knurled wheel 26 until the instrument pointer 36 extends symmetrically across the circular eye 37 of the follow-up pointer 19a. As described in the foregoing, the light value ring 8 will engage by means of its crown gear segment 29 attached thereto, the spur gear 32 on the planetary gear rim 31. Assuming that the direction of rotation of the ring 8 is as indicated by the arrow, and that the shutter speed adjusting ring 5 is kept stationary, the spur gear 32 will roll along the gear segment 30 of the shutter speed adjusting ring 5, rotating thereby counterclockwise, so that planetary gear segment 31 will rotate in the direction of the arrow. Since the second spur gear 33 engages the planetary gear segment 34 secured to the stationary ring 6, the spur gear 33 will rotate in clockwise direction and thereby will turn the diaphragm adjusting ring 7 with the planetary gear segment 35 in the direction also indicated by an arrow.

When the light value ring is rotated and the diaphragm adjusting ring 7 is kept stationary, the spur gear would rotate only around itself in the indicated direction of rotation and would rotate the shutter speed adjusting ring 5 in the direction of the arrow (shown in heavy lines), because the planetary gear rim 31 will be locked against rotation due to the double blocking of the spur gear 33.

A rotative adjustment of the diaphragm adjusting ring 7 in the indicated direction and keeping at the same time the light value ring 8 stationary, will first cause an adjustment of the gear segment 31 in the direction of the arrow and therefore an adjustment of the shutter speed adjusting ring 5 in a direction indicated by the arrow (in dotted lines). A corresponding adjustment takes place when the shutter speed adjustment ring 5 is rotatably adjusted.

It is important to note that all the adjusting rings in view of the gear connections will have the same rotative adjustment as produced by the spur gears 32, 33. If, for example, the angular adjustment interval for each light value interval on the light value ring 8 is 10°, then the operatively connected diaphragm adjusting and shutter speed adjusting rings will be rotatably adjusted by the same amount, namely, 10°. These amounts of rotative adjustments of said rings correspond to the adjusting paths which are necessary for adjusting the diaphragm aperture and the shutter speed of the shutter about one interval each. The axes of the spur gears 32, 33 travel about the optical axis at only half the speed, namely, only by 5°. Owing to the transmission from one gear segment to the other by means of the spur gears a double lever transmission takes place, namely a transmission ratio of 1:1. In this manner the distance between the scale divisions of the various scales on these adjusting rings will be the same and therefore no changes are necessary in the shutter or the diaphragm gearings.

Based on an adjusting path of 10° for each scale interval, the gear segments on the individual rings will have only a relatively short circumferential length. Assuming that the above mentioned scale between two successive values is 10°, the gear segment on the diaphragm adjusting ring at a diaphragm range from 2, 8 to 22 would be only 6×10°=60°.

The shutter speed adjustment ring, if it covers the conventional shutter speeds of B, 1 second, ½ sec. and ¼ to 1/500 of a second, would require a gear segment extending over an angle of only 10×10°=100. The light value ring would require a gear segment of 14×10°=140°. In practice, these gear segments would even be smaller if the distance between the scale intervals is less than 10°.

When as a result of actuating the exposure adjustment members, the limits of the diaphragm range are reached, a rigid connection is established between the diaphragm adjusting ring 7 or its gear segment and the stationary ring 6 by means of the spur gear 33 due to the operation of the stop arrangement 17. When rotating the light value ring 8, for instance by actuating the knurled wheel 26, due to the locking of the planetary gear segment 31 against rotation at 35, 33, 34, the spur gear 32 transmits the rotation of said light value ring 8 only to the shutter speed adjusting ring 5 and adjust the latter in the same manner as has been described in the above mentioned example in which the light value ring 8 was rotated while the diaphragm adjusting ring was kept stationary.

Figure 3:
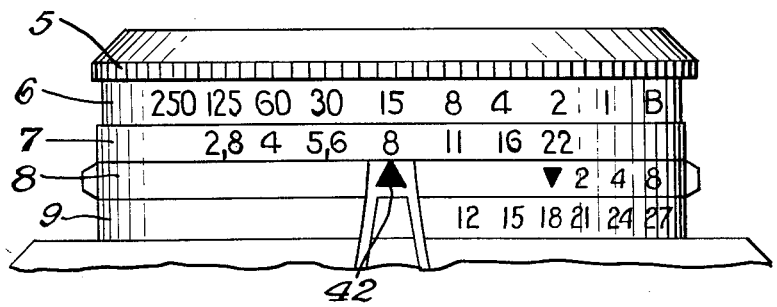
FIGURE 3 shows a particularly advantageous arrangement of the scales.

According to a further embodiment of the present invention a more advantageous arrangement of the scales can be obtained when the ring 6 as shown in FIG. 3 is made adjustable. This ring 6 is the second one from the light entering side of the camera and carries the shutter speed scale and according to FIG. 3 is fixedly connected with the rotatable ring 5 which normally carries the shutter speed index as shown in the embodiment of FIG. 1. Therefore, in FIG. 3 the rings 5 and 6 constitute a constructional unit. The diaphragm adjusting ring 7 adjacent the combined rings 5 and 6 remains unchanged. An index 42 attached to the stationary camera casing is arranged opposite the scales on the two rings 5, 6 and 7. The scales, however, are reversed and also the sun gear segments have to be regarded as being reversed. As was already described in the operation of the first embodiment of the invention, when rotatably adjusting the shutter speed adjusting ring when the light value ring is kept stationary, the diaphragm adjusting ring will also be rotatably adjusted owing to the differential gear connection and vice versa. When the scale rings 6 and 7 are simultaneously moved, the coupled pairs of values on the same will move in front of the stationary mark 42 and each of these pairs of values produce the same blackening of the film. Therefore, each desired diaphragm aperture will have associated therewith a shutter speed belonging to the determined light value and vice versa.

The adjustment ranges of the diaphragm and shutter speed adjusting members are limited by the stops provided in the diaphragm mechanism and shutter mechanism. The number of intervals covered at the diaphragm adjusting member is assumed to be 6 (from the diaphragm aperture value 2, 8 to 22) and the number of intervals which are covered by the shutter speed adjusting member is assumed to be 10 (from B to 500). It is further assumed that by rotating the light value ring 8 relative to the ring 9 carrying the film speed scale having six intervals, the total number of intervals will be increased to 22. The total range of intervals, namely 22, is the highest one which is available to the camera user, but this range is greater than the range of deflection which the follow-up pointer may perform within the casing in which it is mounted. It is therefore possible, unless precautions are taken, that the camera user in extreme cases of exposure values may attempt to deflect the follow-up pointer beyond its range and injures the follow-up pointer when doing so.

In order to eliminate this disadvantage the invention provides, in addition to the already mentioned stops in the shutter mechanism and in the diaphragm mechanism, a few additional stops, for instance, in the transmission connection between the adjusting rings 8, 9 and the follow-up pointer 19. These additional stops preferably consist of an arc-shaped slot 39 arranged concentrically about the axis of the objective in the bottom wall of the dish-shaped cam 24, and a pin 40 attached to a portion of the camera casing (FIG. 1) and extending into said slot. The mentioned additional stops are designed in such a manner that the same permit a sweeping movement of the follow-up pointer 19a over a range covering, for instance 14 intervals. In case the camera requires an adjustment beyond the limits of this range, for instance when the film speed selected is DIN–33, the exposure is B and the diaphragm aperture 2, 8, the effect of the additional stops will be that one of the adjusting members will be blocked against further adjustment during the adjustment of the follow-up indicator when the latter reaches its limit, before the other stops in the shutter and the diaphragm mechanisms become effective.

The slot 39 in the dish-shaped cam 24 together with the pin 40 attached to the camera casing can be dispensed with when the camera casing itself is provided with an arc-shaped recess 41 the ends of which are adapted to be engaged by the coupling plate 23 which extends from the cam 24 upwardly and through said recess 41.

What we claim is:

1. The combination of a photographic camera having a camera casing, a photographic objective, a movable light value adjusting ring, a movable diaphragm adjusting ring, a movable shutter speed adjusting ring and a fixed ring carrying a shutter speed scale and a diaphragm index, all of said rings being concentrically arranged about the optical axis of said photographic objective, and a plurality of gear segments, one for each of said rings and fixedly attached thereto, a photoelectric exposure meter built into said camera casing, said photoelectric exposure meter including an electrical measuring instrument having a pivotally mounted indicating pointer and a manually adjustable follow-up pointer a portion of which is adapted to be brought into coincidence with said indicating pointer, and an operative connection between said light value ring and said follow-up pointer, a transmission gearing between the gear segments of said movable diaphragm adjusting ring and said fixed ring carrying said shutter speed scale and said diaphragm index, and a differential gearing between the gear segments of said movable light value ring and said movable shutter speed ring, said gearings being arranged and constructed in such a manner that the intervals between the diaphragm scale, the shutter speed scale and the light value units are equal.

2. The combination of a photographic camera having a camera casing, a photographic objective, a rotatable diaphragm adjusting ring, a rotatable light value indicating ring, a rotatable shutter speed adjusting ring and a fixed shutter speed scale and diaphragm index carrying ring, all said rings being concentrically arranged about the optical axis of said photographic objective, and a plurality of gear segments, one for each of said rings and fixedly attached thereto, a photoelectric exposure meter built into said camera casing, said photoelectric exposure meter including an electrical measuring instrument having a pivotally mounted indicating pointer and a manually adjustable follow-up pointer a portion of which is adapted to be brought into coincidence with said indicating pointer, and an operative connection between said light value ring and said follow-up pointer, a transmission gearing between the gear segments of said movable diaphragm adjusting ring and said fixed shutter speed scale ring, and a differential gearing between said movable light value ring and said movable shutter speed adjusting ring, said gearings being arranged and constructed in such a manner that the intervals between the diaphragm scale, the shutter speed scale and the light value units are equal.

3. The combination of a photographic camera having a camera casing, a photographic objective, a rotatable diaphragm adjusting ring, a rotatable shutter speed adjusting ring, a rotatable light value indicating ring and a fixed shutter speed scale and diaphragm index carrying ring, all of said rings being concentrically arranged about the optical axis of said photographic objective, a photoelectric exposure meter built into said camera casing, said photoelectric exposure meter including an electrical measuring instrument having a pivotally mounted indicating pointer and a manually adjustable follow-up pointer a portion of which is adapted to be brought into coincidence with said indicating pointer, and an operative connection between said light value ring and said follow-up pointer, a transmission gearing between said diaphragm adjusting ring and said shutter speed scale ring, and a differential gearing between said light value ring and said shutter speed adjusting ring, said gearings being constructed and arranged in such a manner that the intervals between the diaphragm scale, the shutter speed scale and the light value units are equal, and including two sun gear segments attached to said diaphragm adjusting ring and said shutter speed scale and diaphragm index carrying ring, respectively, and two other sun gear segments attached to said light value ring and said shutter speed adjusting ring, respectively, and two spur gears one for each said two sun gear segments and meshing with the same, said spur gears being both rotatably mounted on an annular carrier arranged within said fixed shutter speed scale and diaphragm index carrying ring.

4. The combination in a photographic camera as claimed in claim 3, in which said two spur gears are arranged on diametrically opposed portions of said annular carrier arranged within said fixed shutter speed scale carrying ring.

5. The combination of a photographic camera having a camera casing, a photographic objective, a diaphragm adjusting ring, a shutter speed adjusting ring, a light value indicating ring and a shutter speed scale ring, all of said rings being concentrically arranged about the optical axis of said photographic objective, a photoelectric exposure meter built into said camera casing, said photoelectric exposure meter including an electrical measuring instrument having a pivotally mounted indicating pointer and a manually adjustable follow-up pointer a portion of which is adapted to be brought into coincidence with said indicating pointer, and an operative connection between said light value ring and said follow-up pointer, a transmission gearing between said diaphragm adjusting ring and said shutter speed scale ring, and a differential gearing between said light value ring and said shutter speed adjusting ring, said gearings being constructed in such a manner that the intervals between the diaphragm scale, the shutter speed scale and the light value units are equal, and including two sun gear segments attached to said diaphragm adjusting ring and said shutter speed scale ring, respectively, and two other sun gear segments attached to said light value ring and said shutter speed adjusting ring, respectively, and two spur gears one for each said two sun gear segments and meshing with the same, said spur gears being both rotatably mounted on an annular carrier arranged within said shutter speed scale carrying ring, said sun gear segments being provided with crown gear teeth and said spur gears being rotatably mounted about axes arranged radially on said shutter speed scale carrying ring.

6. The combination in a photographic camera as claimed in claim 1, including stop means for limiting the rotatable adjustment of said diaphragm adjusting ring.

7. The combination in a photographic camera as claimed in claim 5, in which the shutter speed adjusting ring is combined with the shutter speed scale carrying ring to form a unitary shutter speed adjusting ring arranged adjacent the diaphragm adjusting ring having a diaphragm scale thereon, and including a stationary index for both said scales, said scales being arranged with respect to each other so that each associated pair forms a predetermined light value.

8. The combination in a photographic camera as claimed in claim 1, including stop means for limiting the rotatable adjustments of said diaphragm adjusting ring and said shutter speed adjusting ring, and additional stop means permitting the employment of a smaller number of intervals than the number of intervals provided in the scales denoting diaphragm apertures and shutter speeds, said smaller number of intervals preventing an adjustment of the follow-up pointer beyond the range of its predetermined movement.

9. The combination in a photographic camera as claimed in claim 1, including stop means for limiting the rotatable adjustments of said diaphragm adjusting ring and said shutter speed adjusting ring, and additional stop means permitting the employment of a smaller number of intervals than the number of intervals provided in the scales denoting diaphragm apertures and shutter speeds, said smaller number of intervals preventing an adjustment of the follow-up pointer beyond the range of its predetermined movement, said additional means comprising a kidney-shaped slot arranged in a curved cam adapted to be operated by said follow-up pointer and a pin attached to said camera casing and extending into said slot.

10. The combination in a photographic camera as claimed in claim 1, including stop means for limiting the rotatable adjustments of said diaphragm adjusting ring and said shutter speed adjusting ring, and additional stop means permitting the employment of a smaller number of intervals than the number of intervals provided in the scales denoting diaphragm apertures and shutter speeds, said smaller number of intervals preventing an adjustment of the follow-up pointer beyond the range of its predetermined movement, said additional stop comprising a recess provided in said camera housing and a coupling member adapted to be connected with said light value ring and said follow-up pointer.

References Cited in the file of this patent

UNITED STATES PATENTS

| | | |
|---|---|---|
| 2,467,946 | Rossman | Apr. 19, 1949 |
| 2,596,328 | Dorsey | May 13, 1952 |
| 2,922,347 | Hahn | Jan. 26, 1960 |
| 2,926,571 | Sommer | Mar. 1, 1960 |

FOREIGN PATENTS

| | | |
|---|---|---|
| 756,282 | Germany | Feb. 23, 1953 |
| 756,693 | Great Britain | Sept. 5, 1956 |